United States Patent
Wu (10) Patent No.: US 10,971,152 B2
(45) Date of Patent: Apr. 6, 2021

(54) IMAGING CONTROL METHOD AND APPARATUS, CONTROL DEVICE, AND IMAGING DEVICE

(71) Applicant: SZ DJI TECHNOLOGY CO., LTD, Shenzhen (CN)

(72) Inventor: Dan Wu, Shenzhen (CN)

(73) Assignee: SZ DJI Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/540,722

(22) Filed: Aug. 14, 2019

(65) Prior Publication Data

US 2020/0365149 A1 Nov. 19, 2020

Related U.S. Application Data

(63) Continuation of application No. PCT/CN2019/087115, filed on May 15, 2019.

(51) Int. Cl.
*G10L 15/22* (2006.01)
*B64C 39/02* (2006.01)
*G06F 3/16* (2006.01)

(52) U.S. Cl.
CPC ............ *G10L 15/22* (2013.01); *B64C 39/024* (2013.01); *G06F 3/167* (2013.01); *B64C 2201/127* (2013.01); *G10L 2015/223* (2013.01)

(58) Field of Classification Search
CPC ... G10L 15/22; G10L 2015/223; G06F 3/167; B64C 2201/127; B64C 39/024
See application file for complete search history.

(56) References Cited

U.S. PATENT DOCUMENTS

| 6,289,140 B1* | 9/2001 | Oliver | G10L 15/30 |
| | | | 382/313 |
| 2007/0086764 A1 | 4/2007 | Konicek | |
| 2009/0162043 A1* | 6/2009 | Chou | H04N 5/232 |
| | | | 396/56 |

(Continued)

FOREIGN PATENT DOCUMENTS

| CN | 205451432 U | 8/2016 |
| CN | 106373567 A | 2/2017 |
| CN | 106682091 A | 5/2017 |

(Continued)

OTHER PUBLICATIONS

International Search Report dated Feb. 3, 2020, in corresponding International Application No. PCT/CN2019/087115 (4 pages).

(Continued)

*Primary Examiner* — Ahmed A Berhan
(74) *Attorney, Agent, or Firm* — Finnegan, Henderson, Farabow, Garrett & Dunner, LLP (57) ABSTRACT

An imaging control method includes acquiring a device identifier of an imaging device; acquiring voice information; performing information comparison on content data included in the voice information based on the device identifier; analyzing the voice information to identify control information in response to the content data including matching information that matches the device identifier; generating a control command based on the control information; and transmitting the control command to the imaging device to control the imaging device to capture an image.

14 Claims, 6 Drawing Sheets

(56) References Cited

U.S. PATENT DOCUMENTS

2016/0101856 A1* 4/2016 Kohstall ............... G05D 1/101
244/17.13

FOREIGN PATENT DOCUMENTS

| CN | 108154878 | A |   | 6/2018  |         |            |
|----|-----------|---|---|---------|---------|------------|
| CN | 108375986 | A |   | 8/2018  |         |            |
| CN | 108513649 | A |   | 9/2018  |         |            |
| CN | 108702458 | A | * | 10/2018 | ......... | H04N 5/23203 |
| CN | 108702458 | A |   | 10/2018 |         |            |
| CN | 108737719 | A |   | 11/2018 |         |            |
| EP | 3 511 731 | A1 |  | 7/2019  |         |            |

OTHER PUBLICATIONS

Office Action issued Dec. 1, 2020 in corresponding Chinese Application No. 201980001041.3 (7 pages).

* cited by examiner

IMAGING CONTROL METHOD AND APPARATUS, CONTROL DEVICE, AND IMAGING DEVICE

CROSS-REFERENCE TO RELATED APPLICATION

This application is a continuation application of International Application No. PCT/CN2019/087115, filed on May 15, 2019, the entire content of which is incorporated herein by reference.

TECHNICAL FIELD

The present disclosure relates to the field of electronic technology and, more specifically, to an imaging control method and apparatus, a control device, and an imaging device.

BACKGROUND

With the advancement in technology, electronic technology and imaging technology have continued to improve, and cameras of various performances have emerged one after another, such that images of higher quality may be captured. At the same time, a variety of devices for assisting the imaging process have also been developed around the camera. For example, a gimbal may be used to drive the camera to rotate and capture images in multiple directions may carry the movements of the camera to perform tasks such as aerial photography, monitoring, etc. of an Unmanned Aerial Vehicle (UAV). A popular research topic is related to a method to facilitate the automatic control of an imaging device, such as a camera, that may be used to assist a user to capture desired images.

SUMMARY

A first aspect of the present disclosure provides an imaging control method. The imaging control method includes acquiring a device identifier of an imaging device; acquiring voice information; performing information comparison on content data included in the voice information based on the device identifier; analyzing the voice information to identify control information in response to the content data including matching information that matches the device identifier; generating a control command based on the control information; and transmitting the control command to the imaging device to control the imaging device to capture an image.

A second aspect of the present disclosure provides an imaging control method for an imaging device. The imaging control method includes acquiring voice information in a current environment; performing information comparison on content data included in the voice information based on a device identifier set for the imaging device; analyzing the voice information to identify control information in response to the content data including matching information that matches the device identifier; and generating a control command for controlling the imaging device to capture an image based on the control information.

A third aspect of the present disclosure provides a control device. The control device includes a communication interface; a storage device storing program instructions; and a processor. The processor is configured to execute the program instructions to acquire a device identifier of an imaging device; acquire voice information; perform information comparison on content data included in the voice information based on the device identifier; analyze the voice information to identify control information in response to the content data including matching information that matches the device identifier; generate a control command based on the control information; and transmit the control command to the imaging device to control the imaging device to capture an image.

BRIEF DESCRIPTION OF THE DRAWINGS

In order to illustrate the technical solutions provided in the embodiments of the present disclosure more clearly, the accompanying drawings to be used for describing the embodiments are introduced briefly in the following description. It should be apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

The technical solutions in the embodiments of the present disclosure will be described below with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure. In the situation where the technical solutions described in the embodiments are not conflicting, they can be combined.

The imaging devices provided in the embodiments of the present disclosure mainly refer to devices that may assist a user in capturing various desired images. An imaging device may be, for example, a camera, a device including a camera and a gimbal, or a device including a movable platform, such as an unmanned aerial vehicle (UAV) or an intelligent mobile robot, and a camera.

Figure 1:
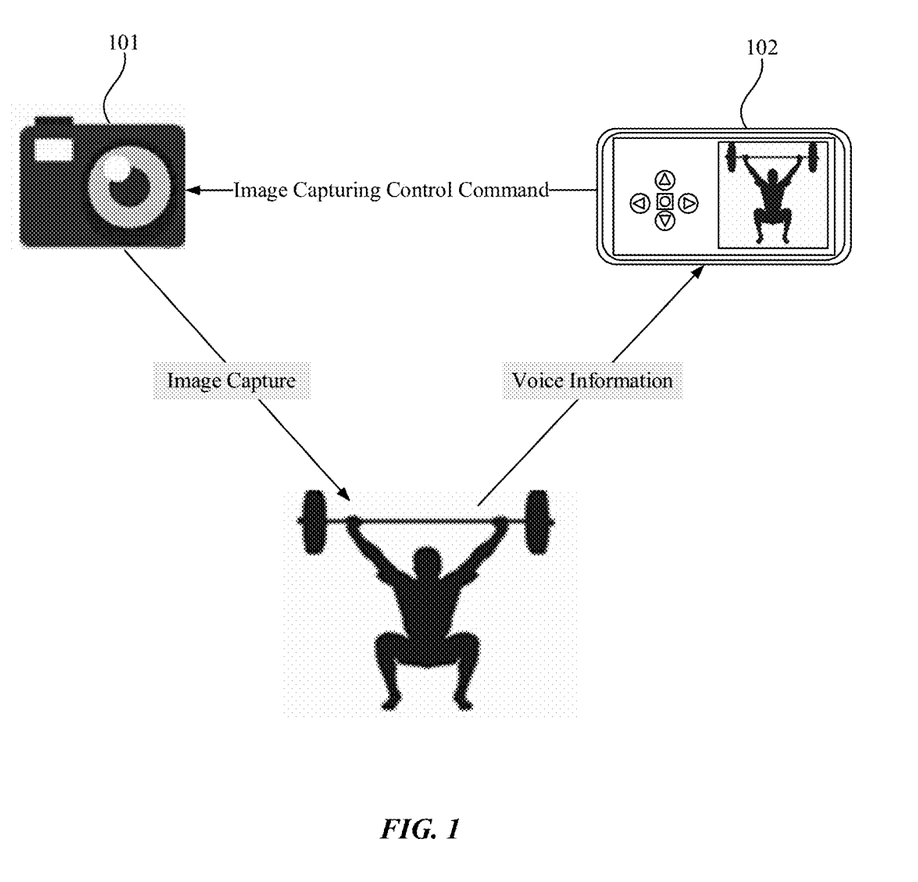
FIG. 1 is a structural diagram of an imaging control system according to an embodiment of the present disclosure.

FIG. 1 is a structural diagram of an imaging control system according to an embodiment of the present disclosure. As shown in FIG. 1, an imaging device 101 may establish a wired or a wireless connection with a control device 102. The connection may be established through, for example, a Bluetooth module, a Wi-Fi module, or a radio frequency module. The control device 102 may be a smart terminal such as a smartphone, a tablet, a smart wearable device, etc., and the user may control the imaging device 101 by operating the control device 102. In FIG. 1, the imaging device 101 is merely provided for illustrative purpose, and the imaging device 101 may be a device that may include a camera and a gimbal, or a device that may include an UAV and a camera.

When the imaging device 101 and the control device 102 establish a connection through Wi-Fi, Bluetooth, a hardware interface, or the like, the imaging device 101 may be placed at any position desired by the user, or fly to any location desired by the user. Further, the user may place the control device 102 connected to the imaging device at any position at which the control device 102 can collect the user's voice. In one embodiment, the user may perform a user operation on the control device 102 to control the imaging device 101 through the control device 102, such as controlling a camera to capture images, controlling the rotation of the gimbal of the imaging device 101 such that the imaging device 101 can capture images in different directions or track an object, or controlling the UAV of the imaging device 101 to fly and capture images of different scenes or track an object.

In one embodiment, the user may also use voice information to control the imaging device 101. After the control device 102 is connected to the imaging device 101, the control device 102 may acquire a device identifier of the imaging device 101, and the device identifier may be an identifier such as a number that the control device 102 may recognize. Further, the identifier may also be a common name of the imaging device, such as a product name or the like. The control device 102 may automatically receive or actively acquire the device identifier of the imaging device 101. Alternatively, after the connection is established, the user can set the device identifier of the currently connected imaging device 101. As such, when the user desires, for example, while performing an activity such as painting, housework, performing music, or exercising, instead of using both hands to operate the control device 102, the user may complete the control of the imaging device 101 by using the voice information.

After the communication connection between the control device 102 and the imaging device 101 is established, the user may issue the voice information. After acquiring the sound signal to obtain the voice information, the control device 102 may automatically determine whether the voice information is the control information based on the device identifier of the currently connected imaging device 101. If the device identifier is not included in the voice information, the voice information may be determined as the normal user communication information or the like, which may not be used as the information to control the imaging device 101, and it may be ignored. If the voice information includes the device identifier of the currently connected device, the voice information may be determined as a control voice, and the control information may be further analyzed from the voice information to facilitate the control of the imaging device 101. For example, for an imaging device named "OSMO," the user may issue voice information such as "OSMO, capture an image." The control device may perform a voice analysis on the collected voice information of the user to determine that matching information of the device identifier "OSMO" is included in the voice. At this time, it may be needed to further analyze the voice information to identify the control information "capture an image," and control the imaging device 101 to start capturing an image based on the control command generated from the control information "capture an image." In another example, for an imaging device named "Mavic," the user may issue the voice information such as "Mavic, take off and shoot me." After the control device 102 performs the voice analysis to identify the matching information of "Mavic," the control device 102 may issue the control information for controlling a UAV to take off and follow the user who issued the voice information, and capture an image.

Figure 2:
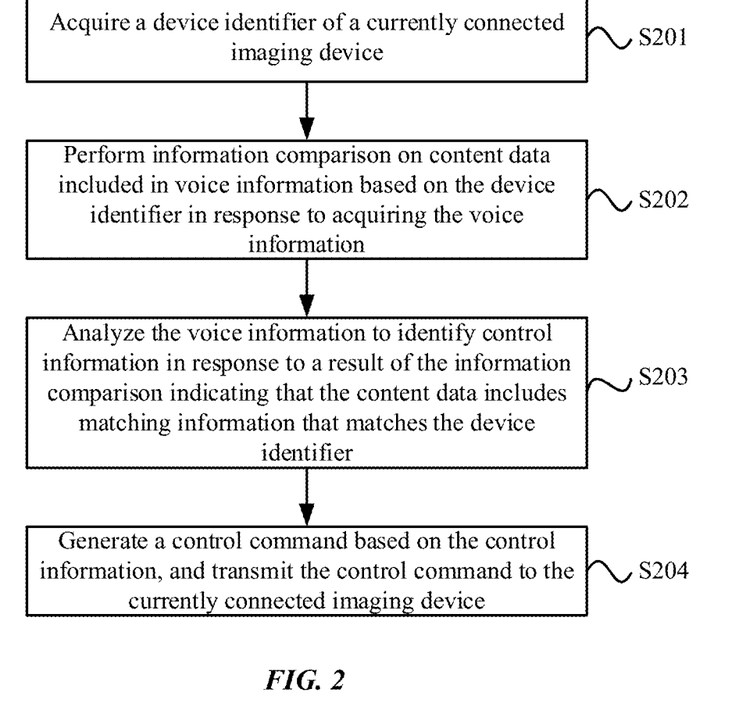
FIG. 2 is a flowchart of an imaging control method according to an embodiment of the present disclosure.

FIG. 2 is a flowchart of an imaging control method according to an embodiment of the present disclosure. The method provided in the embodiments of the present disclosure may be applied to the system shown in FIG. 1. More specifically, the method may be executed by a control device, which may be a smart terminal, such as a smartphone, a tablet, or a smart wearable device, or the like, that may include a wireless transmission function and may be used to collect voice information. A corresponding application (APP) may be installed on the control device to implement the manual control and voice control of the imaging device. The method is described in more detail below.

The user may establish a connection between the control device and the imaging device by using an automatic search or a manual connection. After the connection is established, the control device acquires the device identifier of the currently connected imaging device in S201, and the device identifier may be used to mark the currently connected imaging device in the control device. When two or more imaging devices are connected to the control device, the device identifiers of the imaging devices may be acquired separately, and the device identifiers of different imaging devices may be different. As such, the control device may separately control different imaging devices based on the device identifiers. These device identifiers may be set by the user after the connection is established, automatically reported by the imaging device that established the connection, or automatically set for the imaging device based on historical data after receiving other self-included identifiers, such as hardware identifiers of the imaging device. For example, for an imaging device of model XYZ that is connected to the control device, the control device may intelligently record the device identifier of the imaging device as "XYZ," receive the name "camera" that the user set for the imaging device of model XYZ as the device identifier, or automatically use the name "camera" that was set for the imaging device of model XYZ based on the historical data as the device identifier of the imaging device of XYZ model that is connected this time. In the embodiments of the present disclosure, the device identifier may be mainly an identifier that the user may remember and more accurately express using voice, and identifiers that are difficult to remember may not be a good device identifier of the imaging device. Further, users may name various types of imaging devices based on their needs in order to facilitate the identification of the device identifiers of these imaging devices. In one embodiment, the device identifier may be, for example, the product name, such as "OSMO" or "Mavic" mentioned above, and even a name like "John" or "Michael" may be used as the device identifier of the imaging device.

Figure 3:
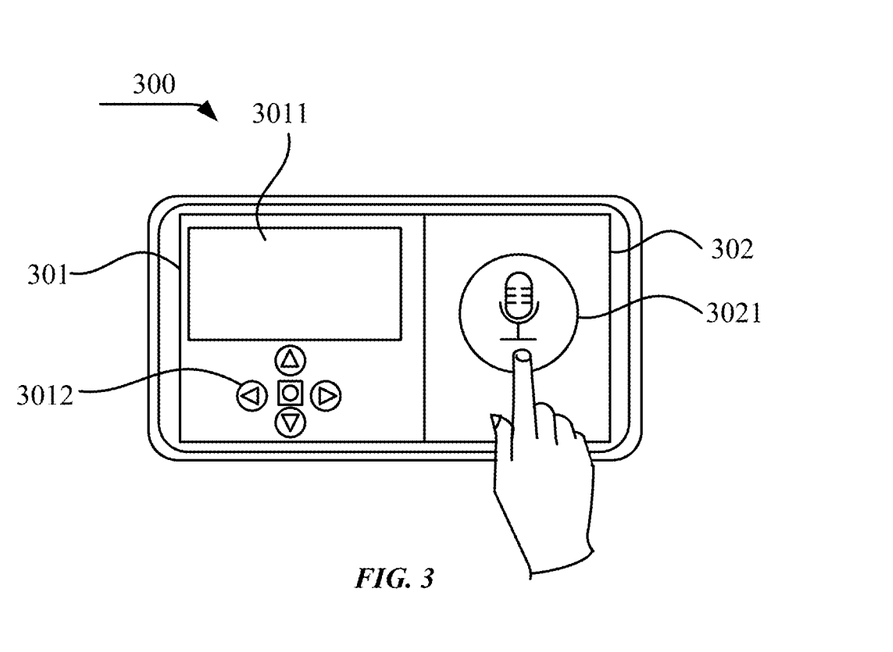
FIG. 3 is a diagram of a user interface displayed on a control device according to an embodiment of the present disclosure.

After the device identifier is acquired, the control device may monitor the possible control operation of the imaging device in real time or periodically. The control operation may be a manual operation initiated by the user on an interface provided on the control device, or it may be a voice operation. FIG. 3 is a diagram of a user interface displayed on a control device 300 according to an embodiment of the present disclosure. As shown in FIG. 3, the user interface includes a first control interface 301 and a second control interface 302. The first control interface 301 includes a button area 3012, and a plurality of virtual direction buttons are disposed at a peripheral of the button area 3012. Further, a button for confirming the image capture is disposed in a middle portion of the button area 3012. By using the virtual direction buttons, the rotation direction of the imaging device including the gimbal may be controlled, thereby realizing the multi-directional imaging controlled by the control device 300. The second interface 302 includes a voice button 3021. When the user single clicks the voice button 3021, the control device 300 may start using a microphone or the like to collect the voice information. In some embodiments, the user interface displayed by the control device 300 may include only the first control interface 301, and the voice collection function may be always on. That is, after the user opens the APP on the control device 300, the monitoring of whether the voice information exists may be performed in real time in order to perform the subsequent operations, and the user may not be required to perform a user operation such as a click operation of a special button. In one embodiment, the method of the present disclosure may further include acquiring and displaying a user operation interface based on the device type, where the user operation interface may include the first control interface 301 for receiving a user operation for controlling the imaging device, and/or the second control interface 302 for receiving the voice command for performing the voice control of the imaging device. That is, the control device 300 may display the first control interface 301 including different virtual buttons for different connected devices. For example, the interface shown in FIG. 3 may be an interface that may be displayed when it is detected that the currently connected imaging device includes a gimbal and a camera. In other interfaces, if it is detected that the currently connected imaging device includes a UAV and a camera, the control buttons for the UAV such as the takeoff control button, the landing button, the reverse control button, or the joystick button may be displayed with some display areas for displaying the flight data, etc. If it is detected that the current connection is simply a camera, the interface may only include virtual buttons such as the image capturing button, the video recording button, and the like.

The control device may detect whether the voice information is collected. If the voice information is collected in S202, an information comparison may be performed on the content data included in the voice information based on the device identifier. The control device may collect the voice information in the environment through a voice collection device such as a microphone. The voice information may be information issued by the user to control the imaging device, or information generated by the user, such as during a normal conversation, that may not be used to control the imaging device. Therefore, after the control device collects the voice information, rather than starting to execute the related processing for generating a corresponding control command, the control device may automatically identify whether the currently collected voice information may be the control voice for controlling the imaging device based on the device identifier acquired in S201.

In S202, the control device performs a content identification on the collected voice information and determine the content data therein. The content data may include text, and for text content, each keyword or key phrase may be identified based on the continuity of the voice. Alternatively, after text in the content data is determined, the keywords or key phrases may be identified by using word split to ensure that more complete keywords and key phrases may be obtained. After the keywords and key phrases are identified, the words or phrases may be separately compared with each word or phrase included in the device information. As such, it may be possible to determine whether the keywords or key phrases included in the voice information match the words or phrases in the device identifier.

In S203, the voice information is analyzed to identify the control information if the information comparison result indicates that the content data includes the matching information that matches the device identifier. The keywords or key phrases identified in S202 may be compared with the device identifier acquired by the control device in S201 to determine whether the same or similar keywords or key phrases in the text content of the voice information may be included in the words or phrases corresponding to the device identifier.

In one embodiment, the determination may be made based on whether the characters are identical (referred to as an "identical determination") and/or similar (referred to as a "similar determination"). For example, the identical determination may include determining whether the pronunciation of a word or a phrase in the text contend corresponding to the voice information is the same as the pronunciation of a word or a phrase in the device identifier. If they are the same, it may be considered that the result of the information comparison is that the content data includes the matching information that matches the device identifier. As another example, the identical determination may include determining whether a keyword or a key phrase in the text content corresponding to the voice information is the same as the character of a word or a phrase in the device identifier. If they are the same, for example, the device identifier includes the word "John" and the text content of the voice information also includes the word "John," then the result of the informant comparison may be that the content data includes the matching information that matches the device identifier.

The similar determination may include determining whether the pronunciation of a word or a phrase in the text contend corresponding to the voice information may be similar to the pronunciation of a word or a phrase in the device identifier. For example, the pronunciation of the word "OSMU" may be similar to the pronunciation of the word "OSMO." As such, it may be considered that the result of the information comparison may be that the content data includes the matching information that matches the device identifier. As another example, the similar determination may include determining whether a word or a phrase in the text content corresponding to the voice information is similar to the character of a word or a phrase in the device identifier. If they are similar, for example, the device identifier includes the word "OSMO" and the text content determined by the voice information includes the keyword "OSMU," which are similar in characters, it may also be considered that the result of the information comparison may be that the content data includes the matching information that matches the device identifier.

In one embodiment, after the matching information is determined, the control device may use the position of the matching information in the voice information as a reference position, analyze the voice information to identify key information, and obtain the control information from the identified key information. The key information may be determined from the voice information based on a positional relationship between the control information and the matching information in an agreed voice information structure. For example, an agreed positional relationship may be first the matching information, followed by the control command. For example, the agreed voice information structure may be {matching information, control command 1, control command 2}. As such, after the matching information is determined based on the comparison result in S202, the immediately following keyword or key phrase in the content data may be used as the key information, and the control information may be obtained from the key information. In simple terms, the keyword or key phrase following the matching information may be used as the key information, and then the valid information may be identified as the control information. Further, words or phrases that may be meaningless or not used for the control operation may be discarded. For example, in a phrase such as "Mavic, take off, hurry up, shoot me," the word "Mavic" may be identified as the matching information, and the following words and phrases such as "take-off," "hurry up," and "shoot me" may be the key information. In particular, the phrase "hurry up" may not be used to control the imaging device, thus may be discarded. For example, when a control command corresponding to the phrase "hurry up" is not found, the key information "hurry up" may be discarded. Therefore, the subsequent phrases "take-off" and "shoot me" may be used to control the take-off of the UAV included in the imaging device, and to control the camera carried by the UAV to start capturing images or videos of a target object.

In one embodiment, obtaining the control information from the identified key information may include: determining a target information set based on a device type of the currently connected imaging device; comparing each piece of identified key information with each piece of target information in the target information set; and selecting the control information from the key information based on the comparison result, where the character corresponding to the selected control information may be the same as the character corresponding to one of the pieces of target information in the target information set, or it may satisfy a predetermined approximation condition. That is, different information sets may be set for different device types, and these information sets may include a plurality of pieces of target information for controlling the imaging device. For example, for an imaging device including a UAV and a camera, the information set may include a large amount of target information such as "take-off," "fly up," "fly down," "land," "shoot," "track the dog," and the target information may correspond to some control commands. In practice, it may only be necessary to compare each piece of key information with the target information in the information set, and when the two are the same or similar, the control information may be determined and the control command may be determined in the end. For example, after the information matching, it is determined that the voice information issued by the user includes the key information "fly up." The key information "fly up" may be similar to "fly upward" in the information set corresponding to the imaging device including the UAV and the camera. As such, the key information "fly up" may be used as the control information, and based on the control command set for "fly upward" in the information set, the control command corresponding to "fly up" may be correspondingly determined, thereby the flight of the UAV of the imaging device can be controlled based on the control information.

In S204, the control device generates a control command based on the control information and transmits the control command to the currently connected imaging device, and the control command may be used to control the imaging device to capture an image. Each piece of control information may be set to correspond to a control command in advance, and a corresponding control command may be obtained based on the control information. Further, the correspondence between the target information and the control command in the information set mentioned above may be predetermined. After the control information is identified based on the target information in the target information set, the control command corresponding to the control information may be generated based on the control command corresponding to the target information, and it may be used to control the imaging device. Further, the control device may transmit the control command to the imaging device via the established communication connection.

In some embodiments, in response to the result of the information comparison indicating that the content data includes the matching information that matches the device identifier, the control device may analyze subsequently collected application information to identify the control information. That is, after the matching information is determined in the current command, the control information may be directly identified by analyzing the subsequently collected voice commands to execute S204 without performing the processing based on the comparison of the device identifier and the voice command. The subsequently collected voice information refers to the voice information collected in a predetermined time frame. For the voice information collected outside the predetermined time frame, S202 to S204 may need to be performed again.

Figure 4:
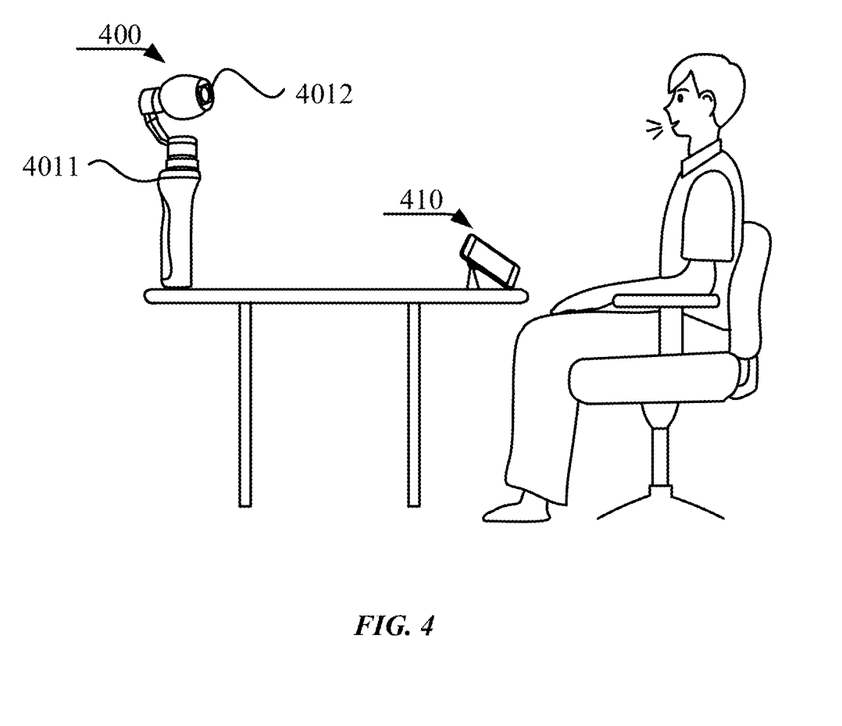
FIG. 4 is a diagram of a scene of imaging control according to an embodiment of the present disclosure.

The imaging device may include various types of imaging devices. FIG. 4 shows an example scene of imaging control consistent with embodiments of the disclosure. In the example shown in FIG. 4, an imaging device 400 includes a gimbal 4011 and a camera 4012 disposed on the gimbal 4011. The imaging device 400 including only the gimbal 4011 and the camera 4012 may be one type of imaging device, for example, it may be named as a first type. Because the gimbal 4011 can rotate, a tracking shot may be realized. With such an imaging device, the generation of the control command based on the control information may include: generating a tracking shot control command in response to the control information including tracking indication information. The tracking shot control command may be used to control the rotation of the gimbal 4011, and trigger the camera 4012 to track the target object included in the tracking indication information.

The tracking indication information may refer to information in the key information that is identical to or similar to a piece of target information for indicating tracking shot in the information sets corresponding to the type of the imaging device 400. Such target information can be, for example, "shoot me," "shoot the dog," "shoot the tree," etc. If the voice command issued by the user includes the same or similar tracking indication information as the target information, then the control information determined based on the key information may be considered to be tracking indication information. Subsequently, it may be needed to recognize "me (the user who initiated the voice command)," "the dog," or "the tree" from the captured image to realize object tracking based on image recognition, and continuously control the camera 4012 to perform the tracking shot. In some embodiments, for the recognition of the target object, a relative orientation may be determined based on the attitude information transmitted by a control device 410 to the gimbal 4011 and attitude of the gimbal 4011, to perform tracking shot for the user who initiated the voice command, another person, or another target object such as "the dog" or "the tree." In some embodiments, the gimbal 4012 can be continuously rotated until a person (by recognizing a facial feature or a bodily feature), a person having a character similar to a designated character (the facial feature or the bodily feature), or an object having the similar character feature of the specific target object such as "the dog" or "the tree," may be identified from the capture image. As such, tracking shot can be performed for the recognized target object (the user initiating the voice command, another user, or another object).

Figure 5:
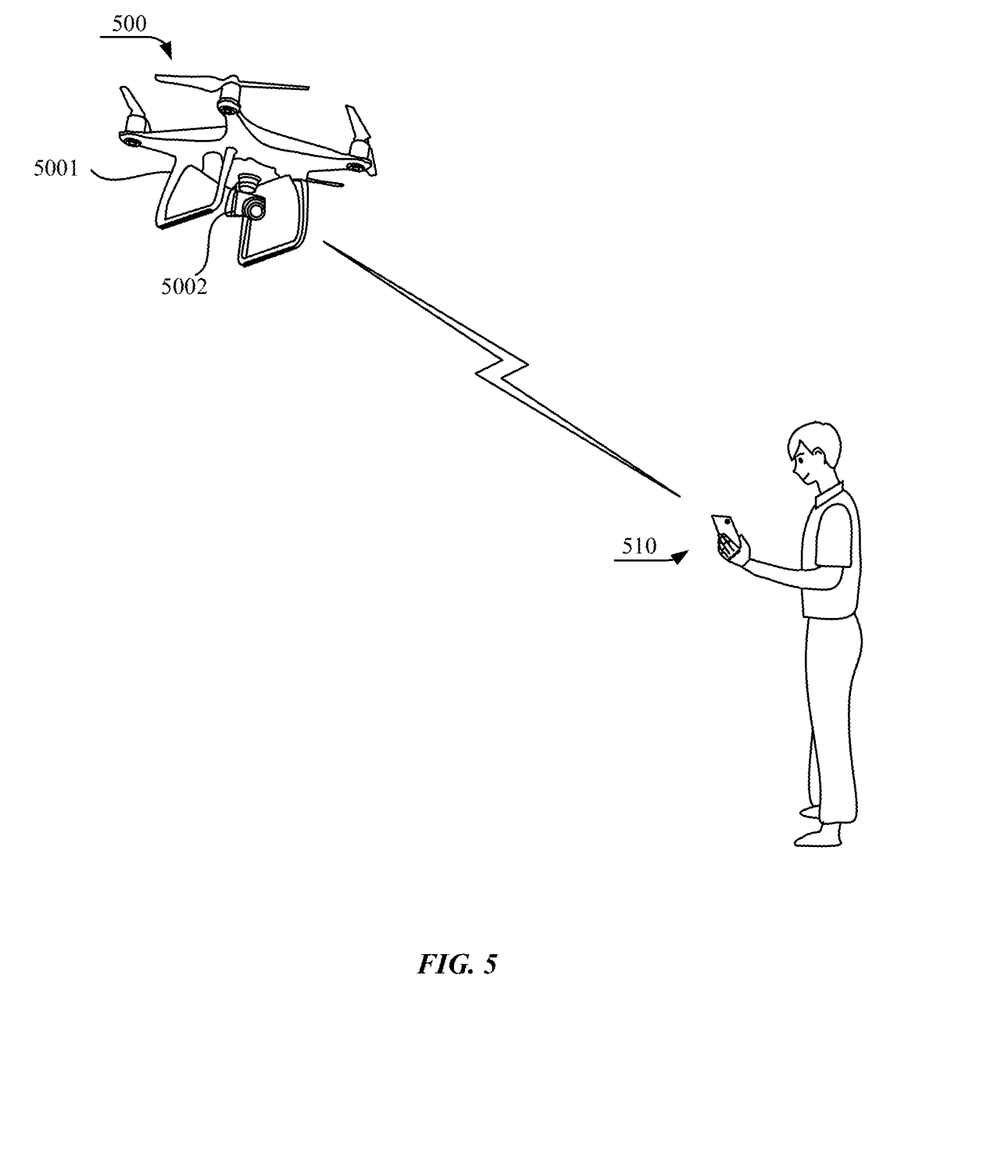
FIG. 5 is a diagram of another scene of imaging control according to an embodiment of the present disclosure.

FIG. 5 shows another example scene of imaging control consistent with embodiments of the disclosure. In the example shown in FIG. 5, an imaging device 500 include a UAV 5001 and a camera 5002 carried by the UAV 5001. The imaging device 500 including only the UAV 5001 and the camera 5002 may be one type of imaging device, for example, it may be named as a second type. With such an imaging device, and the generation of the control command based on the control information may include: generating the tracking control command in response to the control information including the tracking indication information. The tracking control command may be used to control the flight of the UAV 5001, and the target object included in the tracking indication information may be tracked by the camera 5002 during flight. The tracking shot may be easier to implement with the UAV 5001. For example, if a control device 501 determines it is needed to perform tracking shot on the target object such as "me," "the dog," or "the tree" mentioned above based on the voice command, the control device 501 may only need to transmit a tracking shot command including the target object to the UAV 5001, and the UAV 5001 may automatically perform the flight task to implement the tracking shot operation. For the method of determining the tracking indication information from the voice command, reference may be made to the description of the related content of the embodiment corresponding to FIG. 4 described above.

The image-based tacking shot may be realized by a control device. That is, the control device may perform the image recognition and tracking based on the captured image transmitted from the imaging device, and continuously issue a control command to control the rotation of the gimbal or the movement of the UAV. As such, the target object such as "the user who initiated the voice command," "the dog," or "the tree" mentioned above may be maintained in the middle portion of the captured image or another specified position area of the capture image, thereby realizing the tracking shot of the target object.

In the present disclosure, after the voice of the user is detected, whether the user's voice may be the control voice for controlling the imaging device may be determined based on the device identifier acquired in advance, and the imaging device may be further controlled based on the user's voice in response to determining that the user's voice is used to control the imaging device. As such, on one hand, some of the irrelevant voice may be removed, which may effectively avoid the erroneous operation of the imaging device, and on the other hand, ensure that the user may control the imaging device to capture images by voice. In addition, different imaging control logics and control methods may be determined based on the structure and type of different imaging devices, and imaging controls such as the tracking shot may be realized, which may greatly satisfy the user's automation and intelligent needs of the imaging control.

Figure 6:
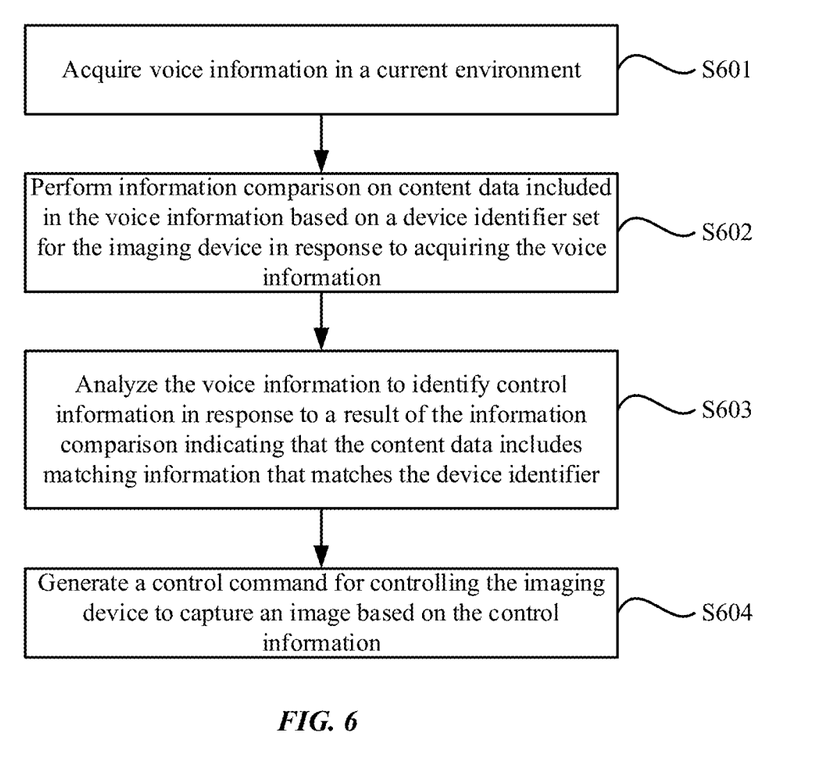
FIG. 6 is a flowchart of another imaging control method according to an embodiment of the present disclosure.

FIG. 6 is a flowchart of another imaging control method according to an embodiment of the present disclosure. The method provided in the embodiments of the present disclosure may be applied to an imaging device, such as a camera or the like that may be fixed at a certain location. The imaging device may include a voice collection device such as a microphone or it may be externally connected to a voice collection device such as a microphone for collecting the voice of the environment in which the imaging device may be currently located. As such, the imaging function may be controlled based on the collected voice of the environment. For example, the start of an image or a video capture, or the imaging device disposed on the gimbal may be controlled based on voice, such that the imaging device may be controlled to tracking shot of a specified object in the user's voice. In one embodiment of the present disclosure, the method may include the following steps.

S601, collecting voice information in the current environment. The voice collection function may be turned on in real time or periodically, and the voice information in the environment in which the imaging device is currently located may be collected by a voice collection device, such as a built-in or an external microphone.

S602, comparing the information in the content data included in the voice information based on the device identifier set for the imaging device in response to the voice information being collected. The specific comparison method may be similar to those described above, and details will not be described herein again.

S603, analyzing the voice information to identify the control information in response to the result of the information comparison being that the content data includes the matching information that matches the device identifier. For the specific implementation of the identification of the control information after the matching information is obtained, reference may be made to the description of the related content in the foregoing embodiments, and details will be not described herein again.

In one embodiment, analyzing the voice information to identify the control information may include: using the position of the matching information in the voice information as a reference position, analyzing the voice information to identify the key information, and obtaining the control command from the identified key information. Further, in one embodiment, obtaining the control information from the identified key information may include: determining a target information set based on a device type of the currently connected imaging device; comparing each identified key information with each target information in the target information set; and selecting the control information from the key information based on the comparison result, where the character corresponding to the selected control information may be the same as the character corresponding to a piece of target information in the target information set, or it may satisfy a predetermined approximation condition.

S604, generating the control command for controlling the imaging device to capture an image based on the control information. For the description of controlling the imaging device after the control command is generated, reference may be made to the description of the related content in the foregoing embodiments, and details will not be described herein again.

In one embodiment, the imaging device may be disposed at a gimbal, for example, a three-axis gimbal or a signal-axis or two-axis gimbal. The imaging device may be connected to the gimbal to control the rotation of the gimbal. The generation of the control command based on the control information may include: generating the tracking shot control command in response to the control information including the tracking indication information. The tracking shot control command may be used to control the rotation of the gimbal, and to perform tracking shot on the target object included in the tracking indication information.

In one embodiment, the imaging device may be disposed at a movable platform. The movable platform may be, for example, a UAV. The imaging device may be connected to the movable platform and may control the movement of the movable platform. The generation of the control command based on the control information may include: generating the tracking control command in response to the control information including the tracking indication information. The tracking control command may be used to control the movement of the movable platform, and tracking shot may be performed on the target object included in the tracking indication information during the movement of the movable platform. In some embodiments, a distance between the movable platform and the user who initiated the voice command should be within a reasonable distance, otherwise the movable platform may not be able to collect the user's control voice in the environment. At this point, the movable platform may continue to execute the control command of the previous voice, such as continuing to perform tracking shot on the target, and the user may control the movable platform to return or stop to execute the corresponding control command by other means, such as a remote controller of the movable platform.

In one embodiment, the imaging device may include a smart terminal including a touch screen on which a user operation interface may be displayed. The method may further include: acquiring and displaying the user operation interface, where the user operation interface may include the first control interface for receiving the user operation for controlling the imaging device, and/or the second control interface for receiving the voice information to facilitate the voice control of the imaging device.

The embodiments described in the several paragraphs immediately above may differ from the corresponding embodiments described earlier in connection with the figures only in that the corresponding steps and functions may be directly implemented on an imaging device including a camera. Except that the execution entity of the specific implementations of these steps and functions may be different, other specific implementation methods may be used in conjunction with each other. For example, in the embodiments described earlier, the first control interface and the second control interface may be displayed on the main control device, and in the embodiments described in the several paragraphs immediately above, these control interfaces may be displayed directly on the imaging device. For the specific display method for displaying these user interfaces on the imaging device, reference may be made to FIG. 3, and for the user operation method, reference may be made to the description of the method corresponding to FIG. 3.

In the present disclosure, after the voice of the user is detected, whether the user's voice is the control voice for controlling the imaging device may be determined based on the device identifier acquired in advance, and the imaging device may be further controlled based on the user's voice in response to determining that the user's voice is used to control the imaging device. As such, on one hand, some of the irrelevant voice may be removed, which may effectively avoid the erroneous operation of the imaging device, and on the other hand, it can be ensured that the user may control the imaging device to capture the images by voice. In addition, different imaging control logics and control methods may be determined based on the structure and type of different imaging devices, and imaging controls such as the tracking shot may be realized, which may satisfy the user's automation and intelligent needs of the imaging control.

Figure 7:
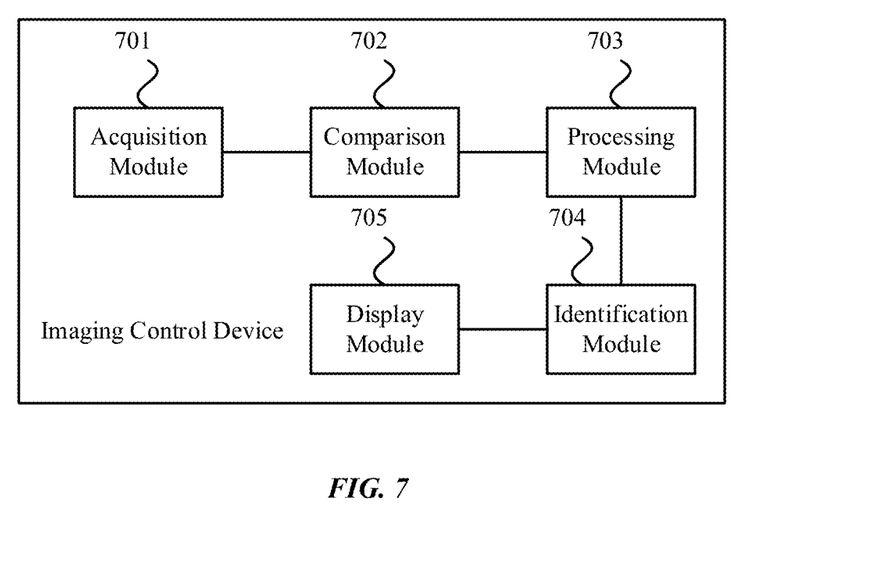
FIG. 7 is a structural diagram of an imaging control apparatus according to an embodiment of the present disclosure.

FIG. 7 is a structural diagram of an imaging control apparatus according to an embodiment of the present disclosure.

The apparatus provided in the embodiments of the present disclosure may be provided in a control device for controlling an imaging device. The control device may, for example, include or be part of a smart terminal such as a smartphone, a tablet, a smart wearable device, or the like. Further, the control device may be coupled to the imaging device for controlling the imaging device. The device of the embodiment of the present disclosure may also be directly arranged at the imaging device. In the example shown in FIG. 7, the imaging control device includes an acquisition module 701, a comparison module 702, and a processing module 703.

The acquisition module 701 may be configured to acquire a device identifier of the imaging device. The comparison module 702 may be configured to perform information comparison on the content data included in the voice information based on the device identifier in response to acquiring the voice information. The processing module 703 may be configured to analyze the voice information to identify the control information in response to the result of the information comparison indicating that the content data includes the matching information that matches the device identifier, and generate the control command based on the control information. The control command may be used to control the imaging device to capture an image.

In one embodiment, as shown in FIG. 7, the device further includes an identification module 704 configured to identify a device type of the imaging device and a display module 705 configured to acquire and display a user operation interface based on the device type. The user operation interface may include a first control interface for receiving a user operation for controlling the imaging device and/or a second control interface for receiving the voice information to facilitate the voice control of the imaging device.

In one embodiment, the processing module 703 may be configured to use the position of the matching information in the voice information as a reference position, analyze the voice information to identify the key information, and obtain the control command from the identified key information.

In one embodiment, the processing module 703 may be configured to determine a target information set based on the device type of the imaging device; compare each piece of identified key information with each piece of target information in the target information set; and select the control information from the key information based on the comparison result, where the character corresponding to the selected control information may be the same as the character corresponding to one of pieces of the target information in the target information set, or it may satisfy a predetermined approximation condition.

In one embodiment, the imaging device may include a gimbal and a camera disposed on the gimbal. The processing module 703 may be configured to generate the tracking control command in response to the control information including the tracking indication information. The tracking control command may be used to control the rotation of the gimbal, such that tracking shot may be performed on the target object included in the tracking indication information.

In one embodiment, the imaging device may include an UAV and a camera carried by the UAV. The processing module 703 may be configured to generate the tracking control command in response to the control information including the tracking indication information. The tracking control command may be used to control the flight of the UAV, such that tracking shot may be performed on the target object included in the tracking indication information during the flight of the UAV.

In one embodiment, the processing module 703 may be further configured to analyze the subsequently collected application information to identify the control information in response to the result of the information comparison being that the matching information that matches the device identifier is included in the content data.

For the specific implementations of the various functional modules included in the embodiments described earlier, reference may be made to the detailed description of the related content in the foregoing embodiments, and details will not be described herein again.

In the present disclosure, after the voice of the user is detected, whether the user's voice is the control voice for controlling the imaging device may be determined based on the device identifier acquired in advance, and the imaging device may be further controlled based on the user's voice in response to determining that the user's voice is used to control the imaging device. As such, on one hand, some of the irrelevant voice may be removed, which may effectively avoid the erroneous operation of the imaging device, and on the other hand, it can be ensured that the user may control the imaging device to capture the images by voice. In addition, different imaging control logics and control methods may be determined based on the structure and type of different imaging devices, and imaging controls such as the tracking shot may be realized, which may satisfy the user's automation and intelligent needs of the imaging control.

Figure 8:
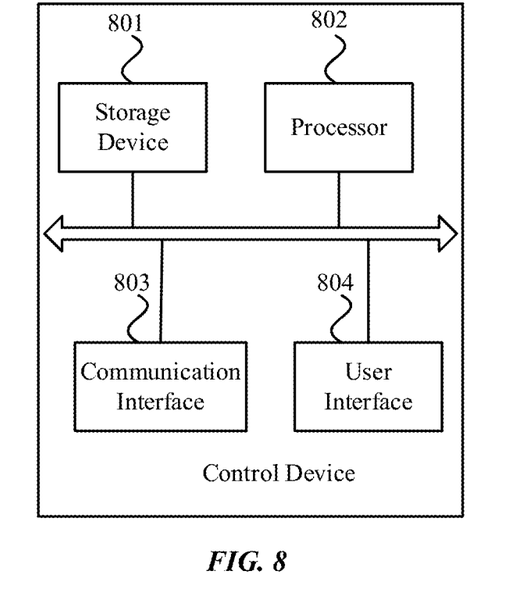
FIG. 8 is a structural diagram of a control device according to an embodiment of the present disclosure.

FIG. 8 is a structural diagram of a control device according to an embodiment of the present disclosure. The control device of the embodiment of the present disclosure may specifically be a smart terminal such as a smartphone, a tablet, a smart wearable device, or the like. As shown in FIG. 8, the control device includes a storage device 801, a processor 802, and a communication interface 803. In some embodiments, the control device may also include other structure as such a user interface 804 shown in FIG. 8, as needed.

The storage device 801 may include a volatile memory such as a Random-Access Memory (RAM). In some embodiments, the storage device 801 may include a non-volatile memory such as a flash memory, a Solid-State Drive (SSD), etc. In some embodiments, the storage device 801 may include a combination of the above types of memories.

The processor 802 may be a Central Processing Unit (CPU). The processor 802 may further include a hardware chip. The hardware chip may be an Application-Specific Integrated Circuit (ASIC), a Programmable Logic Device (PLD), etc. The PLD may be, for example, a Field-Programmable Gate Array (FPGA), a General Array Logic (GAL), etc.

The communication interface 803 may be an interface that may be used to establish a wireless communication connection with the imaging device, such as a Wi-Fi interface or a Bluetooth interface. In some embodiments, the communication interface 803 may be a wired interface such as a USB interface. The user interface 804 may be primarily used to realize the human-machine interaction. The user interface 804 may be, for example, a touch screen, which may be used to display the user interface, the related control buttons, the collected data, and the like to the user, and it may also be configured to receive the user's operation to manually control the camera, the gimbal, the UAV, or the like in the imaging device.

In one embodiment, the storage device 801 may store program instructions. The processor 802 may be configured to execute the program instructions to implement the imaging control method described in the foregoing embodiments of the present disclosure.

More specifically, the processor 802 may be configured to execute the program instructions stored in the storage device 801 to acquire a device identifier of the currently connected imaging device; perform information comparison on the content data included in the voice information based on the device identifier in response to acquiring the voice information; analyze the voice information to identify the control information in response to the result of the information comparison indicating that the content data includes the matching information that matches the device identifier; and generate the control command based on the control information and transmit the control command to the currently connected imaging device through a communication module, where the control command may be used to control the imaging device to capture an image.

In one embodiment, the processor 802 may be further configured to identify a device type of the currently connected imaging device; and acquire and display a user operation interface based on the device type. The user operation interface may include a first control interface for receiving a user operation for controlling the imaging device and/or a second control interface for receiving the voice information to facilitate the voice control of the imaging device.

In one embodiment, the processor 802 may be configured to use the position of the matching information in the voice information as a reference position, analyze the voice information to identify the key information, and obtain the control command from the identified key information.

In one embodiment, the processor 802 may be configured to determine a target information set based on the device type of the currently connected imaging device; compare each piece of identified key information with each piece of target information in the target information set; and select the control information from the key information based on the comparison result, where the character corresponding to the selected control information may be the same as the character corresponding to one of pieces of the target information in the target information set, or it may satisfy a predetermined approximation condition.

In one embodiment, the imaging device may include a gimbal and a camera disposed on the gimbal. The processor 802 may be configured to generate the tracking control command in response to the control information including the tracking indication information. The tracking control command may be used to control the rotation of the gimbal, such that tracking shot may be performed on the target object included in the tracking indication information.

In one embodiment, the imaging device may include an UAV and a camera carried by the UAV. The processor 802 may be configured to generate the tracking control command in response to the control information including the tracking indication information. The tracking control command may be used to control the flight of the UAV, and tracking shot may be performed on the target object included in the tracking indication information during the flight of the UAV.

In one embodiment, the processor 802 may be further configured to analyze the subsequently collected application information to identify the control information in response to the result of the information comparison being that the matching information that matches the device identifier is included in the content data.

For the specific implementations of the processor 802 included in the embodiments described earlier, reference may be made to the detailed description of the related content in the foregoing embodiments, and details will not be described herein again.

In the present disclosure, after the voice of the user is detected, whether the user's voice is the control voice for controlling the imaging device may be determined based on the device identifier acquired in advance, and the imaging device may be further controlled based on the user's voice in response to determining that the user's voice is used to control the imaging device. As such, on one hand, some of the irrelevant voice may be removed, which may effectively avoid the erroneous operation of the imaging device, and on the other hand, it can be ensured that the user may control the imaging device to capture the images by voice. In addition, different imaging control logics and control methods may be determined based on the structure and type of different imaging devices, and imaging controls such as the tracking shot may be realized, which may satisfy the user's automation and intelligent needs of the imaging control.

Figure 9:
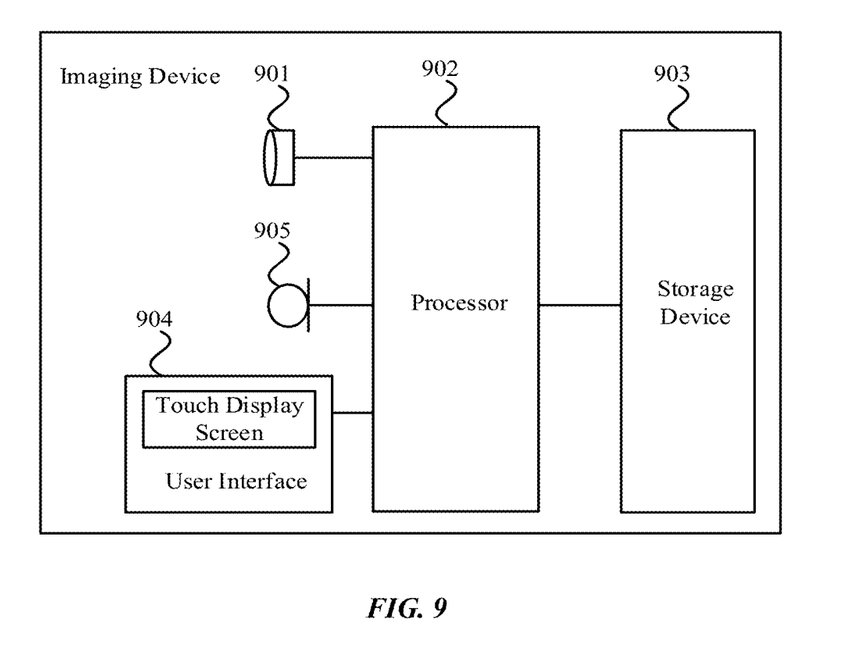
FIG. 9 is a structural diagram of an imaging device according to an embodiment of the present disclosure.

FIG. 9 is a structural diagram of an imaging device according to an embodiment of the present disclosure. As shown in FIG. 9, the imaging device includes a camera 901, a processor 902, and a storage device 903. In some embodiments, the imaging device also includes a user interface 904, as shown in FIG. 9. In some embodiments, the imaging device may include other components such as a power supply module and a voice acquisition module. The voice acquisition module may be a microphone or a module that may receive voice information outputted by an external sound pickup module. In the example shown in FIG. 9, the imaging device includes a microphone 905 as an example of the voice acquisition module.

The storage device 903 may include a volatile memory such as a Random-Access Memory (RAM). In some embodiments, the storage device 903 may include a non-volatile memory such as a flash memory, a Solid-State Drive (SSD), etc. In some embodiments, the storage device 801 may include a combination of the above types of memories.

The processor 902 may be a Central Processing Unit (CPU). The processor 902 may further include a hardware chip. The hardware chip may be an Application-Specific Integrated Circuit (ASIC), a Programmable Logic Device (PLD), etc. The PLD may be, for example, a Field-Programmable Gate Array (FPGA), a General Array Logic (GAL), etc.

The processor 902 may be configured to execute the program instructions stored in the storage device 903 to acquire the voice information in the current environment; perform information comparison on the content data included in the voice information based on the device identifier set for the imaging device in response to acquiring the voice information; analyze the voice information to identify the control information in response to the result of the information comparison indicating that the content data includes the matching information that matches the device identifier; and generate the control command for controlling the imaging device to capture an image based on the control information.

In one embodiment, the processor 902 may be further configured to acquire and display a user operation interface based on the device type of the imaging device The user operation interface may include a first control interface for receiving a user operation for controlling the imaging device and/or a second control interface for receiving the voice information to facilitate the voice control of the imaging device. The user operation interface may be displayed on the user interface 904 mentioned above, which may be a touch screen.

In one embodiment, the processor 902 may be configured to use the position of the matching information in the voice information as a reference position, analyze the voice information to identify the key information, and obtain the control command from the identified key information.

In one embodiment, the processor 902 may be configured to determine a target information set based on the device type of the imaging device; compare each piece of identified key information with each piece of target information in the target information set; and select the control information from the key information based on the comparison result, where the character corresponding to the selected control information may be the same as the character corresponding to one of pieces of the target information in the target information set, or it may satisfy a predetermined approximation condition.

In one embodiment, the imaging device may be disposed on a gimbal. The processor 802 may be configured to generate the tracking control command in response to the control information including the tracking indication information. The tracking control command may be used to control the rotation of the gimbal, such that tracking shot may be performed on the target object included in the tracking indication information.

In one embodiment, the imaging device may be disposed at a movable platform, such as a UAV. The processor 902 may be configured to generate the tracking control command in response to the control information including the tracking indication information. The tracking control command may be used to control the movement of the movable platform, such that tracking shot may be performed on of the target object included in the tracking indication information during the movement of the movable platform.

In one embodiment, the processor 902 may be further configured to analyze the subsequently collected application information to identify the control information in response to the result of the information comparison being that the matching information that matches the device identifier is included in the content data.

For the specific implementations of the processor 902 included in the embodiments described earlier, reference may be made to the detailed description of the related content in the foregoing embodiments, and details will not be described herein again.

In the present disclosure, after the voice of the user is detected, whether the user's voice is the control voice for controlling the imaging device may be determined based on the device identifier acquired in advance, and the imaging device may be further controlled based on the user's voice in response to determining that the user's voice may be used to control the imaging device. As such, on one hand, some of the irrelevant voice is removed, which may effectively avoid the erroneous operation of the imaging device, and on the other hand, it can be ensured that the user may control the imaging device to capture the images by voice. In addition, different imaging control logics and control methods may be determined based on the structure and type of different imaging devices, and imaging controls such as the tracking shot may be realized, which may satisfy the user's automation and intelligent needs of the imaging control.

It should be noted that a person skilled in the art should understand that all or part of the processes of the methods in the embodiments may be implemented by a computer program instructing the relevant hardware. The program may be stored in a computer readable storage medium. When the program is run, the processes of the methods in the embodiments are performed. The storage medium may be a magnetic disk, an optical disk, a read-only memory (ROM) or a random access memory (RAM), and the like.

The foregoing merely describes the example embodiments of the present invention and is not intended to limit the present disclosure. Any modification, equivalent replacement, or improvement made without departing the spirit and principle of the present disclosure shall fall within the scope of the disclosure.

What is claimed is:

1. An imaging control method comprising:
   acquiring a device identifier identifying an imaging device;
   acquiring voice information and performing content identification on the voice information to determine content data of the voice information;
   performing information comparison on the content data of the voice information based on the device identifier;
   analyzing the voice information to identify control information, in response to a determination that the content data of the voice information includes at least one keyword or key phrase that matches the device identifier;
   generating a control command based on the control information; and
   transmitting the control command to the imaging device to control the imaging device to capture an image.

2. The method of claim 1, further comprising:
   identifying a device type of the imaging device; and
   acquiring and displaying a user operation interface based on the device type, the user operation interface including at least one of:
      a first control interface configured to receive a user operation for controlling the imaging device, or
      a second control interface configured to control reception of the voice information.

3. The method of claim 1, further comprising:
   analyzing the content data of the voice information to identify key information using a position of the at least one keyword or key phrase in the content data as a reference position; and
   obtaining the control information from the key information.

4. The method of claim 3, wherein obtaining the control information from the key information includes:
   determining a target information set based on a device type of the imaging device;
   comparing the key information against the target information set; and
   selecting the control information from the key information based on:
      a result of the comparison,
      a character corresponding to the control information being the same as a character corresponding to a piece of target information in the target information sets, or
      satisfying an approximation condition.

5. The method of claim 1,
   wherein the imaging device includes a gimbal and a camera carried by the gimbal; and
   wherein generating the control command based on the control information includes:
      generating a tracking control command in response to the control information including tracking indication information, the tracking control command being configured to control the gimbal to rotate and trigger the camera to perform tracking shot on a target object included in the tracking indication information.

6. The method of claim 1,
   wherein the imaging device includes an unmanned aerial vehicle (UAV) and a camera carried by the UAV; and
   wherein generating the control command based on the control information includes:
      generating a tracking control command in response to the control information including tracking indication information, the tracking control command being configured to control a flight of the UAV and trigger the camera to perform tracking shot on a target object included in the tracking indication information.

7. The method of claim 1, further comprising:
   analyzing subsequently collected voice information to identify the control information in response to the determination that the content data includes the at least one keyword or key phrase that matches the device identifier.

8. An imaging control method for an imaging device, the method comprising:
   acquiring voice information in a current environment and performing content identification on the voice information to determine content data of the voice information;
   performing information comparison on the content data in of the voice information based on a device identifier set for the imaging device, wherein the device identifier identifies the imaging device;
   determining whether the content data of the voice information includes at least one keyword that matches the device identifier;
   analyzing the voice information to identify control information in response to the determination that the content data includes the at least one keyword that matches the device identifier; and
   generating a control command for controlling the imaging device to capture an image based on the control information.

9. A control device comprising:
   a communication interface;
   a storage device storing program instructions; and
   a processor configured to execute the program instructions to:
      acquire a device identifier identifying an imaging device;
      acquire voice information and perform content identification on the voice information to determine content data of the voice information;
      perform information comparison on the content data of the voice information based on the device identifier;
      analyze the voice information to identify control information, in response to a determination that the content data of the voice information includes at least one keyword or key phrase that matches the device identifier;
      generate a control command based on the control information; and
      transmit the control command to the imaging device to control the imaging device to capture an image.

10. The control device of claim 9, wherein the processor is further configured to execute the program instructions to:

identify a device type of the imaging device; and acquire and display a user operation interface based on the device type, the user operation interface including at least one of:
- a first control interface configured to receive a user operation for controlling the imaging device, or
- a second control interface configured to control reception of the voice information.

11. The control device of claim 9, wherein the processor is further configured to execute the program instructions to:
- analyze the content data of the voice information to identify key information using a position of the at least one keyword or key phrase in the content data as a reference position; and
- obtain the control information from the key information.

12. The control device of claim 11, wherein the processor is further configured to execute the program instructions to:
- determine a target information set based on a device type of the imaging device;
- compare the key information against the target information set; and
- select the control information from the key information based on:
  - a result of the comparison,
  - a character corresponding to the control information being the same as a character corresponding to a piece of target information in the target information sets, or
  - satisfying an approximation condition.

13. The control device of claim 9, wherein:
- the imaging device includes a gimbal and a camera carried by the gimbal;
- the control information includes tracking indication information; and
- the control command includes a tracking control command configured to control the gimbal to rotate and trigger the camera to perform tracking shot on a target object included in the tracking indication information.

14. The control device of claim 9, wherein:
- the imaging device includes an unmanned aerial vehicle (UAV) and a camera carried by the UAV;
- the control information includes tracking indication information; and
- the control command includes a tracking control command configured to control a flight of the UAV and trigger the camera to perform tracking shot on a target object included in the tracking indication information.

* * * * *